United States Patent [19]

Parmentier et al.

[11] Patent Number: 4,957,520
[45] Date of Patent: Sep. 18, 1990

[54] APPARATUS FOR THE REMOVAL OF VAPORS AND VAPOR PRODUCTS

[75] Inventors: Michel Parmentier, Haroue; Jean-Charles Weber, Dombasle, both of France

[73] Assignee: France Grignotage S.A.R.L., Dombasle, France

[21] Appl. No.: 341,544

[22] Filed: Apr. 19, 1989

[30] Foreign Application Priority Data

Apr. 19, 1988 [FR] France .................................. 88 05324

[51] Int. Cl.⁵ ........................ B01D 53/04; B01D 53/24
[52] U.S. Cl. ........................................ 55/269; 55/316; 55/337; 55/DIG. 36; 55/467; 126/299 D
[58] Field of Search ................... 55/189, 269, 337, 184, 55/DIG. 36, 164, 169, 316, 467; 126/299 D

[56] References Cited

U.S. PATENT DOCUMENTS

| | | | |
|---|---|---|---|
| 3,260,189 | 7/1966 | Jensen | 55/269 X |
| 4,350,504 | 9/1982 | Diachuk | 55/DIG. 36 X |
| 4,460,386 | 7/1984 | Diachuk | 55/269 X |
| 4,502,871 | 3/1985 | Andersen et al. | 55/337 X |
| 4,615,715 | 10/1986 | Seshamani | 55/269 |
| 4,643,742 | 2/1987 | Harmonskog | 55/20 |

Primary Examiner—Charles Hart
Attorney, Agent, or Firm—Weiser & Stapler

[57] ABSTRACT

A device for removing (i.e., suction, capture and trapping) vapors and products carried by the vapors, for placement above a system for cooking food products in water or oil, circulates the exhaust gases in a cyclone having cooled walls to cause cold-wall condensation of the exhaust gases over the flow path through the cyclone.

9 Claims, 1 Drawing Sheet

APPARATUS FOR THE REMOVAL OF VAPORS AND VAPOR PRODUCTS

BACKGROUND OF THE INVENTION

The present invention generally relates to a device for the removal of vapors and condensable products carried by such vapors, for placement above systems for cooking food products in water or oil.

Devices of this general type have for some time been employed, for example, above appliances such as fryers or grills. However, such devices are generally complex in structure and are therefore difficult to clean. As a result, such devices tend to provide unsatisfactory performance in their practical application.

SUMMARY OF THE INVENTION

It is therefore the primary object of the present invention to provide a removal device of the above-mentioned type which is simple, inexpensive and highly efficient.

It is also an object of the present invention to provide a removal device of this general type which is easy to maintain.

It is also an object of the present invention to provide a removal device of this general type which serves to significantly reduce unpleasant smells.

These and other objects are achieved in accordance with the present invention by providing a device for the removal (i.e., suction, capture and trapping) of vapors and products carried by such vapors, primarily for placement above systems for cooking food products in water or oil, which operates to circulate the received gases in a cyclone having cooled walls, thereby causing cold-wall condensation over the flow path through the cyclone. The emission of steam into the cooking area is thus completely eliminated and the ejected gases are cleared of solid and liquid particles (e.g., aerosol, dust, etc.) as a result of the cyclone's effect.

The cyclone condenser is preferably maintained under a slight vacuum relative to the collecting hood with which it is associated, preferably by means of an extraction turbine located at the outlet of the cyclone.

Further detail regarding the apparatus of the present invention is provided with reference to the detailed description which is provided below, taken in conjunction with the following illustrations.

DETAILED DESCRIPTION OF THE PREFERRED EMBODIMENT

Figure 1:
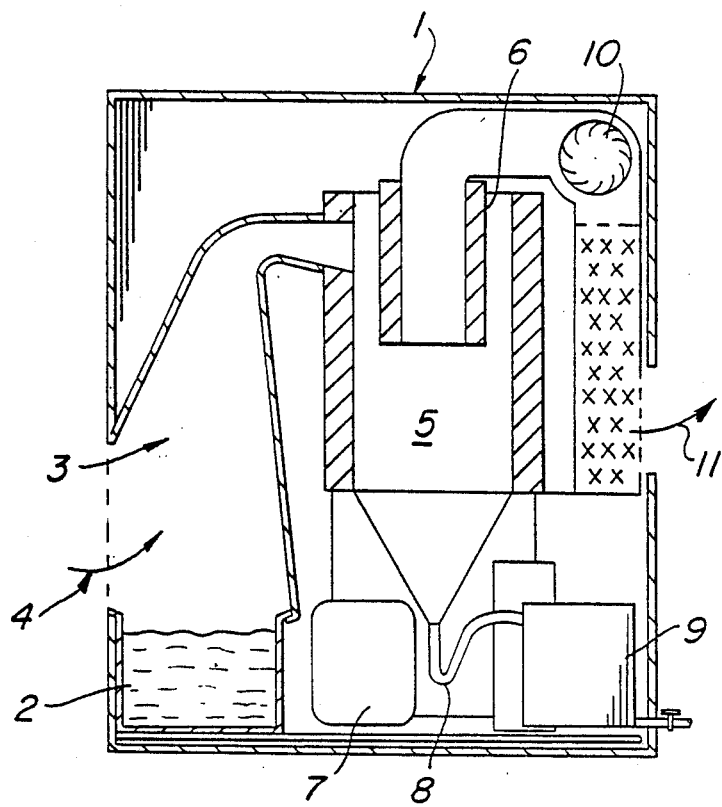
FIG. 1 is a diagrammatic, side elevation view of a device according to the present invention.
Figure 2:
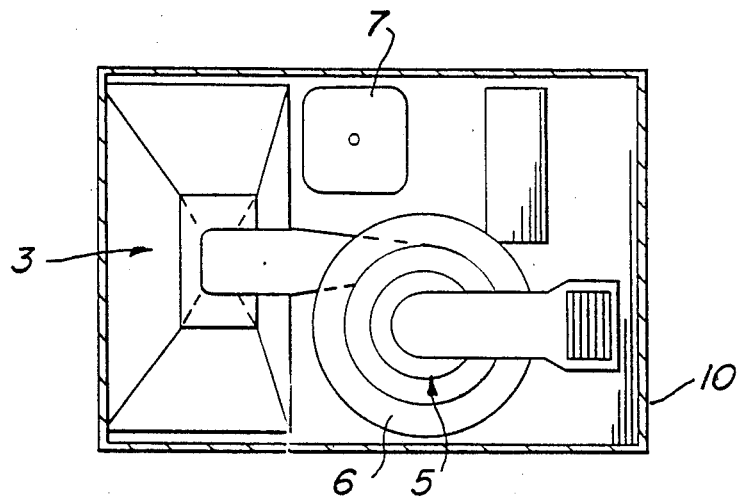
FIG. 2 is a top plan view of the device of FIG. 1.

The removal device 1 is generally intended for placement above an appliance 2 which tends to generate more or less laden steam exhausts, such as a chip-cooking appliance for example. To this end, a hood 3 for capturing vapors and other exhaust products is arranged above the appliance 2. If appropriate, the vapors can be diluted by an air flow 4 received through orifices in the hood (preferably through a filter).

The hood 3 terminates in a duct which tangentially enters a cyclone 5. The cyclone 5 operates as a condenser, and to this end incorporates external cooling means 7 for operating upon at least the upper portions 6 of the cyclone 5. The refrigerating capacity for the cooling means 7 is provided by any of a variety of known means such as, for example, a suitable refrigerant fluid under direct expansion, or a circulation of an appropriately cooled flow of water.

To be noted is that the vapor condensation system of the present invention simultaneously operates to ensure the separation of both gases and aerosols formed. The resulting condensates are recovered at the bottom of the cyclone 5 by an assembly comprised of a syphon 8 and a drainage tank 9.

Flow through the cyclone 5 is preferably supplemented by an extraction turbine 10 (i.e., fan) which communicates with central portions of the cyclone 5 to maintain the cyclone 5 under a slight vacuum relative to the hood 3. It is important to note that with the exception of the extraction turbine 10, the system of the present invention has only static elements requiring maintenance limited to periodic cleaning. This periodic cleaning is still further reduced since the walls of the cyclone 5 tend to be cleaned on a continuous basis due to the streaming of condensed water.

The outlet 11 of the turbine 10 is advantageously equipped with an absorption filter having a cartridge of activated charcoal or the like. This operates to complete the desired purification by trapping non-condensable products.

It will be understood that various changes in the details, materials and arrangement of parts which have been herein described and illustrated in order to explain the nature of this invention may be made by those skilled in the art within the principle and scope of the invention as expressed in the following claims.

We claim:

1. An apparatus requiring reduced maintenance and cleaning, for removing vapors and condensable and non-condensable products carried by said vapors for placement above a system for cooking food products in water or oil, and having a hood, a cyclone having upper and lower portions, means for recovering the condensable products and an absorption filter, said apparatus comprising:
   (a) a hood for receiving vapors and condensable and non-condensable products carried by said vapors and communicating with upper portions of the cyclone;
   (b) a cyclone under a partial vacuum relative to the hood for separating condensable products from non-condensable products wherein the condensable products condense against the cooled walls of the cyclone over the path of gases circulating through the cyclone thereby cleaning the walls on a continuous basis with streaming of condensed water, and wherein the non-condensable products are diverted to an absorption filter;
   (c) an absorption filter located at an outlet of the cyclone for trapping non-condensable products; and
   (d) recovering means in a lower portion of the cyclone for recovering condensable products including a syphon.

2. The apparatus of claim 1 further comprising an extraction turbine positioned at an outlet of the cyclone and communicating with the cyclone for maintaining the cyclone under a partial vacuum.

3. The apparatus of claim 2 wherein the extraction turbine draws non-condensable products to the absorption filter.

4. The apparatus of claim 1 wherein the recovering means include a drainage tank.

5. The apparatus of claim 1 wherein the cyclone has externally located cooling means for the cyclone wall.

6. The apparatus of claim 1 wherein the cyclone has externally located cooling means disposed along upper portions of the cyclone.

7. The apparatus of claim 6 wherein said external cooling means have a refrigerating capacity developed by a refrigerant fluid under direct expansion.

8. The apparatus of claim 5 wherein said external cooling means have a refrigerating capacity developed by circulation of water.

9. The apparatus of claim 1 wherein the absorption filter is activated charcoal.

* * * * *